Figure 1:
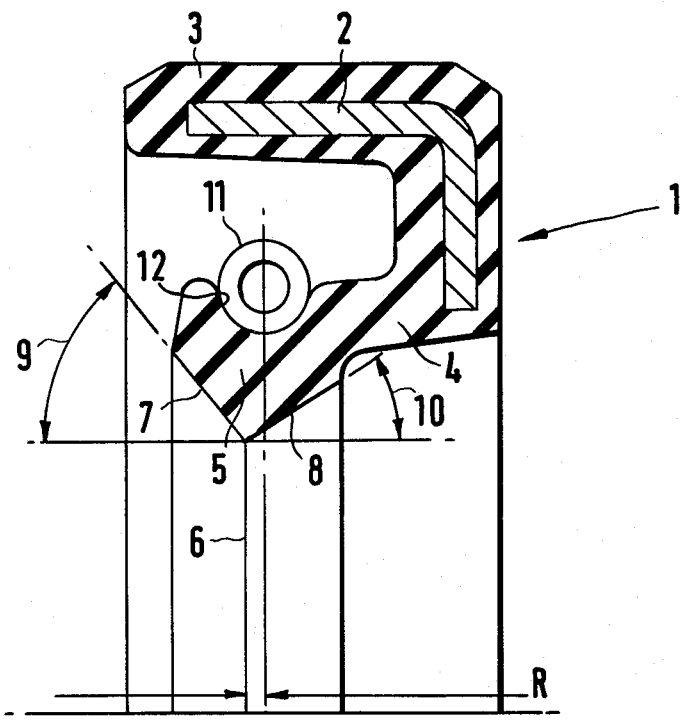

United States Patent [19]
Johnston et al.

[11] 3,921,987
[45] Nov. 25, 1975

[54] SHAFT SEALS

[75] Inventors: David Ernest Johnston, Newcastle-upon-Tyne; Peter John Russell, Morpeth, both of England

[73] Assignee: George Angus & Company Limited, England

[22] Filed: June 18, 1973

[21] Appl. No.: 370,775

[30] Foreign Application Priority Date
June 29, 1972 United Kingdom............ 30418/72

[52] U.S. Cl.................................. 277/134; 277/153
[51] Int. Cl.² ...................... F16J 15/32; F16J 15/48
[58] Field of Search ........... 277/134, 133, 153, 152, 277/237

[56] References Cited
UNITED STATES PATENTS

| | | | |
|---|---|---|---|
| 3,127,185 | 3/1964 | Evans.............................. | 277/153 X |
| 3,392,226 | 7/1968 | McKinven...................... | 277/153 X |
| 3,504,920 | 4/1970 | Halliday............................. | 277/134 |
| 3,586,342 | 6/1971 | Staab.................................. | 277/134 |
| 3,633,927 | 1/1972 | Van Deven........................ | 277/134 |

FOREIGN PATENTS OR APPLICATIONS 1,065,682  9/1959  Germany ........................... 277/153

Primary Examiner—Harry N. Haroian
Attorney, Agent, or Firm—Larson, Taylor and Hinds

[57] ABSTRACT

In a rotary shaft lip seal comprising a moulded ring of elastomeric material with positive action ridges moulded on the air side, moulded face is concave so as to meet the sealing edge at a sharply defined angle and the positive action ridges preferably have the shape each of a triangle or rhomboid with a point meeting the sealing edge and ends merging into the concave moulded face.

11 Claims, 8 Drawing Figures

SHAFT SEALS

This invention relates to shaft seals and in particular rotary shaft lip seals, known also as oil seals, which basically are moulded rubber or like elastomeric rings used to seal annular spaces around shafts, and like machine parts, to retain oil and exclude dust and dirt.

Such seals are widely used in industry, especially for automobiles, and well-accepted terminology for them will be used in this specification.

We have found that the performance of rotary shaft lip seals may be improved by making them with a concave moulded face, on the air side, to meet the sealing edge at a relatively large shaft angle and thus provide a well-defined sharp divergence of the moulded face from the sealed surface.

In our application Ser. No. 370,730 of even date we have fully described an embodiment of a seal with a concave moulded face.

In the present application we combine with the new feature of a concave moulded face a positive action feature, comprising the provision of ridges on the concave moulded face to feed back oil tending to leak past the seal.

Positive action ridges on frusto-conical moulded faces of lip seals are of course now well known but the new combination offers not only improved performance, through better definition of sealing contact, but facilitates production of moulding tools for the positive action feature.

More specifically, according to the invention, a rotary shaft lip seal, comprising a moulded ring of elastomeric material with a sealing lip having a sealing edge defined by a moulded face, on the air side of the seal, moulded with positive action ridges having an even number of vane surfaces obliquely meeting the sealing edge in opposite circumferential directions at a small angle, is characterised by the feature that the moulded face is concave so as to meet the sealing edge at a sharply defined angle.

Preferably, the small angle at which the vane surfaces meet the sealing edge is not more than 20°, and specifically much smaller, viz. less than 10° or even 5° to the plane of the sealing edge or sealing band. Also, the term "obliquely meeting" includes intercepting or substantially meeting, such as approaching tangentially, the sealing edge.

The sharply defined angle at which the concave moulded face meets the sealing edge is preferably a tangent angle of between 50° and 80° inclusive. This covers the optimum angles for seals of elastomeric material having a Young's modulus of between 3.5 and 8.5 MN/m². The possibility of an angle outside the stated range is however not precluded, especially a smaller angle for a stiffer material.

Other features of the invention are included in the following description with reference, by way of example, to the accompanying drawings.

For completeness of description, in FIGS. 1 to 4 of the drawings the relevant seal terminology is illustrated as well as the embodiment of a concave moulded face seal as described in our said application Ser. No. 370,730.

The present invention is illustrated by FIGS. 5 to 8.

Figure 2:
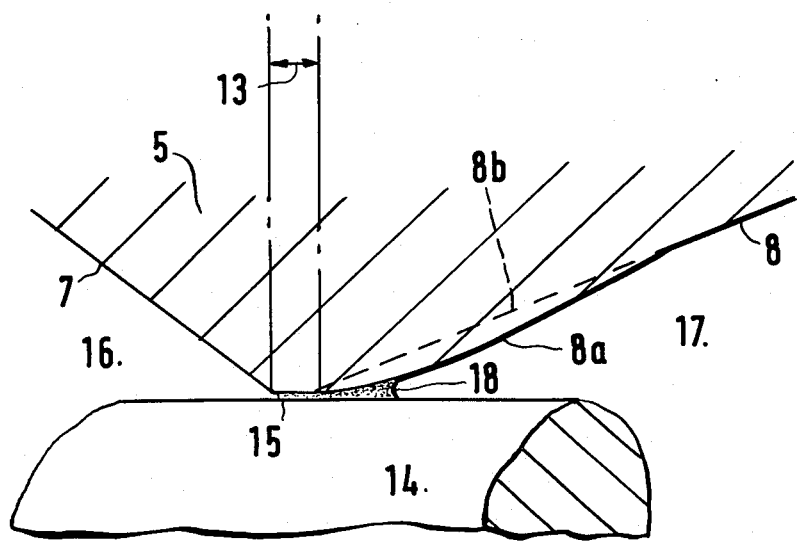
Figure 3:
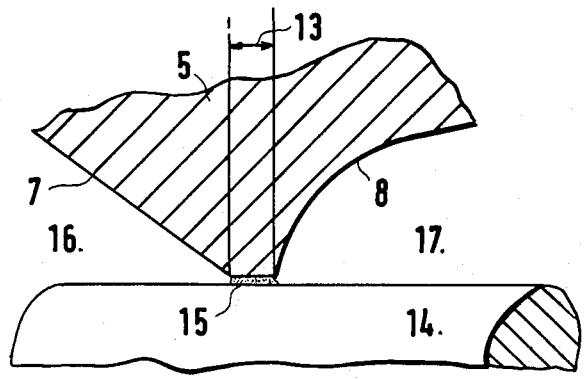
Figure 4:
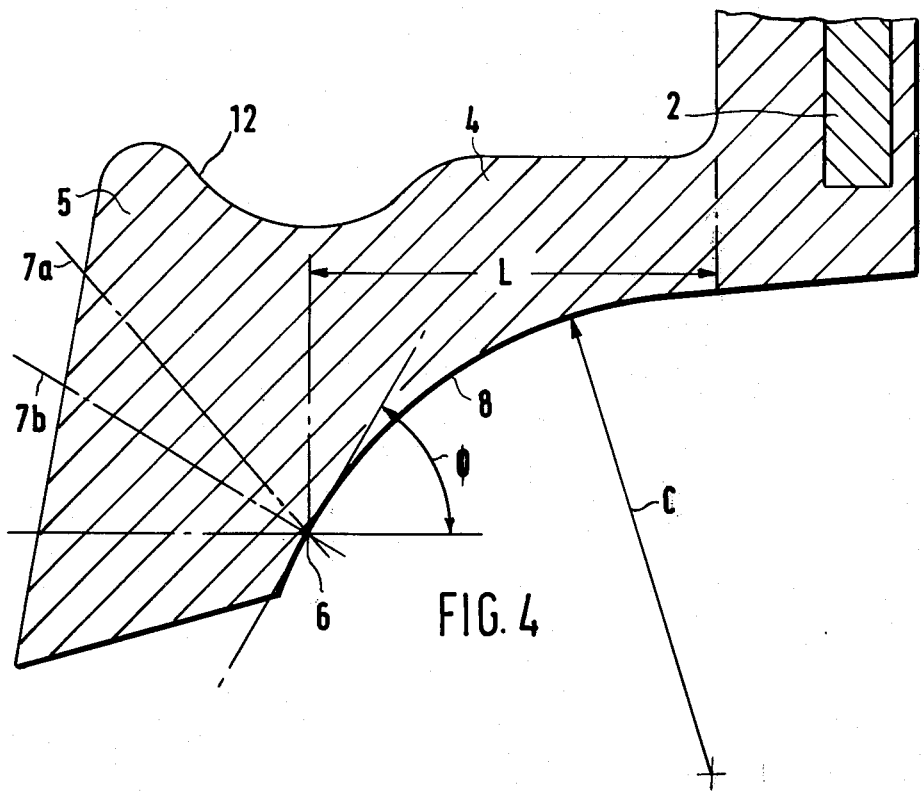
Figure 5:
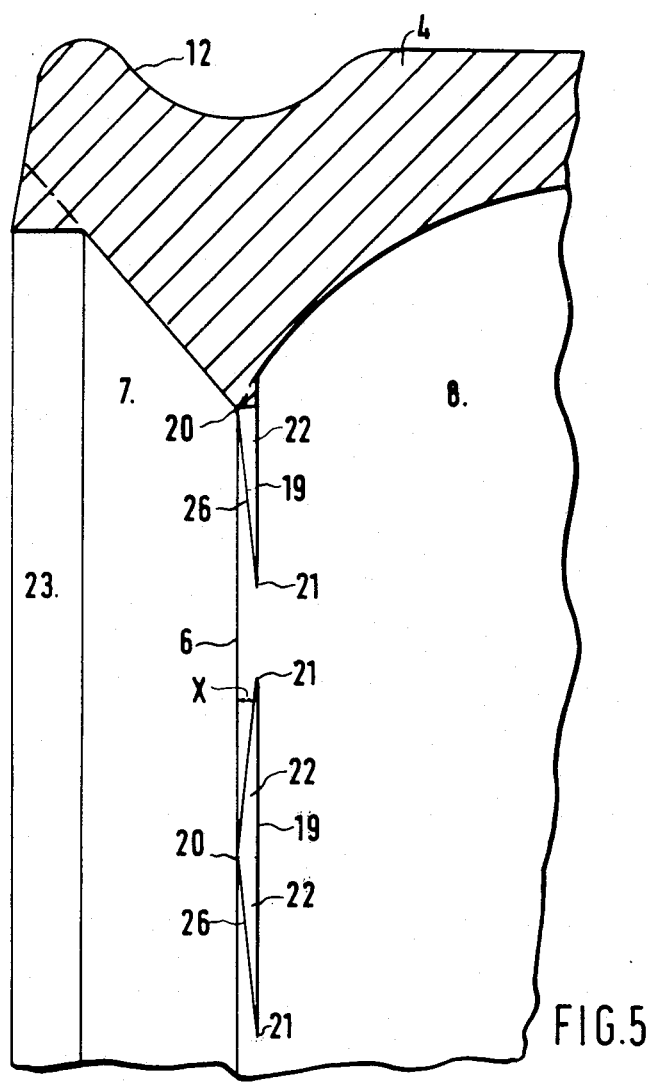
Figure 6:
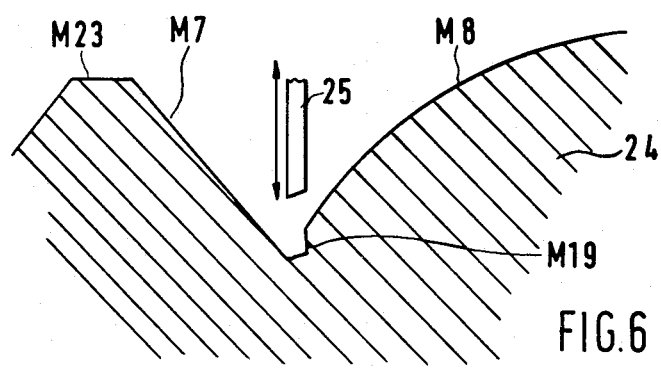
Figure 7:
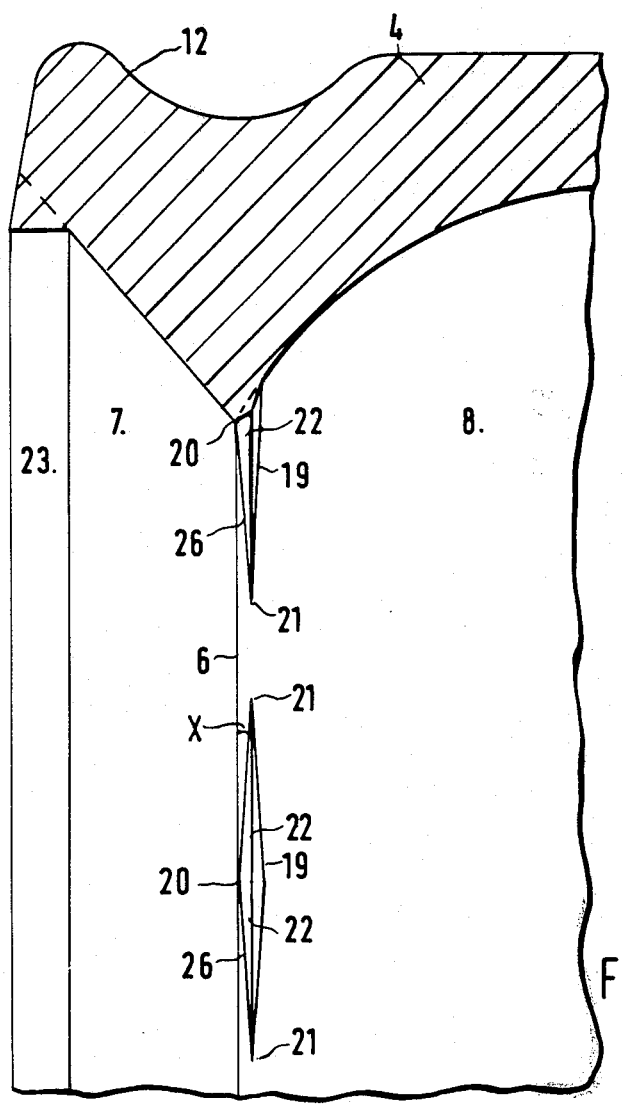
Figure 8:
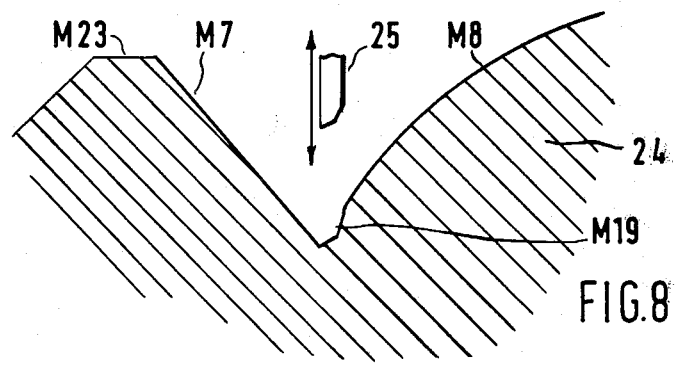

In the drawings:

FIG. 1 is a diagrammatic axial half-section of a typical rotary shaft lip seal, to illustrate the relevant terminology, FIG. 2 is an exaggerated fragmentary axial cross-section of a seal lip to show the defect of bulging of the moulded face spoiling sharp definition of the back of the sealing wear land, FIG. 3 is an enlarged fragmentary axial cross-section of a lip of a seal with a curved shaft angle, to illustrate the principle, FIG. 4 is an axial cross-section of a plain lip, as moulded and before trimming, of a seal with a curved shaft angle, FIG. 5 is an enlarged fragmentary axial section of a moulded-edge seal provided with positive action ridges in accordance with the invention, FIG. 6 is a diagrammatic fragmentary axial cross-section of the centre pin of a moulding die, and of the machining tool, for moulding the seal of FIG. 5, and FIGS. 7 and 8 are views, corresponding to FIGS. 5 and 6, showing an alternative shape of positive action ridges.

A seal as shown by FIG. 1 comprises a moulded rubber ring 1 stiffened by a metal insert 2 so that it can be mounted as an interference fit in a shaft housing against which an external peripheral rubber cover 3 makes a static seal.

To seal peripherally with a wiping contact around the shaft, the seal has a flexible lip comprising a leg 4 and a head 5 on which a sealing edge 6 is formed by the junction between a front or inner frusto-conical surface 7, called the trim face by derivation from its formation by trimming of the moulded ring 1, and a back or outer frusto-conical surface 8, called the moulded face because, in contrast to the trim face 7, it is always formed in the moulding of the ring 1. It should here be mentioned that the face 7 need not be formed by trimming but can be moulded, at least in part, to produce a so-called "moulded-edge" seal. The angle 9 is the trim angle and the angle 10 the moulded angle, also known as the shaft angle.

In use, the face 7 is directed towards the sealed fluid, the corresponding front of the seal being also known as the oil side, and the face 8 is directed away from the sealed fluid, the corresponding back of the seal being also known as the air side.

To load the sealing edge resiliently on to the shaft, the sealing head is embraced by a garter spring 11, seated in a groove 12, and the axial distance between the spring groove centre line and the sealing edge 6 is known as the R value, positive if the spring groove is behind the sealing edge, as in the example shown, or negative if the spring groove is in front of the sealing edge.

The sealing edge 6 initially is a fine edge, as trimmed or moulded, but in use the edge wears or beds in and broadens, if only slightly, to form a narrow cylindrical surface known as the seal wear land, or sealing band or contact band, which is illustrated, on an exaggerated scale, in FIG. 2 as a cylindrical land 13 replacing the edge 6.

Between the land 13 and the shaft 14 ideally a stable oil film 15 should be maintained to prevent leakage from the oil side 16 to the air side 17 of the seal in its annular space around the shaft.

Depending upon the inside diameter interference, between the seal and shaft diameters, the softness of the rubber and the load of the garter spring 11, there is a tendency in some known lip seals for the frusto-conical moulded face 8 to bulge towards the shaft, as indicated at 8a, instead of retaining its moulded form, indicated by the broken line 8b.

When bulging occurs, there is increased likelihood of the seal leaking and it is possible that this is due to the oil film 15 becoming extended at the back into a progressively widening cusp-section resulting in axial instability in the meniscus, indicated as 18, which then breaks down with consequent leakage.

The principle of the curved shaft angle feature is illustrated by FIG. 3, in comparison with FIG. 2, and comprises the moulded face 8 being concave so that, even with deflection or deformation of the sealing head 5, the moulded face 8 will always sharply meet and maintain well defined the sealing wear land 13.

It must be emphasised that the discussion above, with reference to FIG. 2, of the possible effect of bulging of the frusto-conical moulded face 8 of some known lip seals is given not as a proven theory but only to assist appreciation of one possible improvement offered by the new feature of concave formation of the moulded face.

It is however a fact that a suitable concave formation of the moulded face ensures sharp or well-defined shaft contact and it is observable that this improves reliability of the seal.

The same feature of concave formation of the moulded face enables the leg 4 and sealing head 5 to be designed for flexure of the lip about the junction between the leg and the radial web of the moulded ring 1, or an equivalent locus of flexure in the case of a bonded lip seal in which the lip is bonded on to a radial flange of a metal case.

Such angular flexure, regarded in axial section, of the lip permits a greater adaptability of the sealing edge to expand uniformly to suit a range of shaft diameters, although different garter springs may be required to suit different shaft diameters. Also, when the seal is running on a shaft, the greater lip flexibility improves accommodation to shaft surface imperfections and vibration.

It is possible that some improvement might be obtained by modifying any shaft lip seal to a concave moulded face meeting the sealing edge, an eventual sealing wear land, but it is not likely to be significant for seals required to be of hard material, e.g. more than 90° I.R.H. (International Rubber Hardness).

In the preferred embodiment, the seal has a lip of elastomeric material with a Young's modulus of between 3.5 and 8.5 MN/m². Examples of suitable materials are oil-resistant synthetic rubber, such as nitrile rubbers and silicone rubbers, having a hardness in the range 55° to 90° I.R.H.

One example of a concave form of the lip of a seal is illustrated by FIG. 4 which shows a lip as moulded and before trimming, on the line 7a or 7b for example, to form both the trim face, at the desired angle, and the sealing edge 6 at the required nominal diameter.

The axial dimension L, from the sealing edge to the junction of the leg 4 with the radial web, or equivalent part of the moulded ring, is known as the lip height and from this can be determined the appropriate curvature for the concavity of the moulded face 8 to give a required tangent angle $\phi$.

For circular concavity, the radius C is given by
$$C = (L/\sin \phi)$$

The concavity need not be circular, although this is probably the most convenient form for the manufacture of moulding tools, and an equivalent parabola or other curve of the second degree may be used, particularly if it is desired to obtain a given gradation in thickness, and thus flexibility, of the leg 4.

The moulded face 8 need not be concave throughout but could have a concave portion meeting the sealing edge and merging into a straight frusto-conical surface within the lip height L.

Two examples of such a positive action seal in accordance with the present invention are illustrated by FIGS. 5 and 7.

FIG. 5 shows the concave moulded face 8 moulded with ridges 19 which, as seen in outline from the axis of the seal, have the form of very obtuse isosceles triangles meeting the sealing edge 6 at their apices 20 and merging into the face 8 at their base ends 21.

In cross-section, the ridges 19 are triangular and each has a pair of flank surfaces 22 providing the positive action vane surfaces obliquely meeting the sealing edge.

The flank surfaces 22 are moulded very slightly axially oblique to the seal axis so that they become substantially parallel thereto when the seal lip stretches on to a shaft.

The seal of FIG. 5 has a moulded sealing edge 6 and a moulded front face 7 which, in the example shown, has a shoulder 23 which may eventually be trimmed off. The seal is formed by a moulding die centre pin 24 illustrated by FIG. 6, the centre pin surfaces M7, M8 and M23 respectively producing the seal surfaces 7, 8 and 23.

The ridges 19 are formed by grooves M19 machined in the centre pin by turning it in a lathe and radially reciprocating, such as by synchronised cam control, a cutting tool 25 the tip of which has the profile for the required cross-section of the ridges 19.

It will be appreciated that the actual shape of the grooves M19 and thus of the ridges 19 will depend upon the relative velocities of turning of the centre pin 24 and reciprocation of the tool 25, the shape of the front edges 26 of the ridges 19 being sinuous and tangential to the sealing edge 6 rather than the converging straight lines shown by the drawing.

The size of the ridges 19 in reality is small, e.g. their progressive projection from the surface 8 being from 0.0 to 0.3 mm, and their angle X of approach to the sealing edge 6 is small, e.g. corresponding to a straight line approach angle of less than 5°.

FIGS. 7 and 8 correspond to FIGS. 5 and 6, the same reference numerals being used for corresponding parts, but show narrow diamond-shaped or rhomboidal ridges 19, formed by grooves M19 produced by a tool 25 with an appropriate tip profile. The rhomboidal ridges each present a transverse point 20 meeting the sealing edge 6 and longitudinal ends 21 merging into the concave moulded face 8, in the same way as triangular ridges, but can be more resistant to lateral deflection, than triangular ridges, and also involve only obtuse grooves in the centre pin, easier for release of mouldings.

Although the invention has been described as applied to an internal seal, to seal against a shaft surface, it can of course be applied to an external seal which seals against the surface of a surrounding housing.

We claim:

1. A rotary shaft lip seal comprising a moulded ring of elastomeric material with a sealing lip having a sealing edge defined by a moulded face, on the air side of the seal, moulded with positive action ridges having an even number of vane surfaces obliquely meeting the sealing edge in opposite circumferential directions at a small angle, said moulded face being concave so as to meet the sealing edge at a sharply defined angle and said ridges, at the ends thereof further from said sealing edges being merged smoothly into the curvature of the arcuate concavity of the moulded face.

2. A seal according to claim 1, characterised thereby that the vane surfaces of the positive action ridges meet the sealing edge at an angle of not more than 10°.

3. A seal according to claim 2, characterised thereby that the concave moulded face meets the sealing edge at a tangent angle of between 50° and 80° inclusive.

4. A seal according to claim 3, characterised thereby that the elastomeric material has a Young's modulus of between 3.5 and 8.5 MN/m$^2$.

5. A seal according to claim 2, characterised thereby that the positive action ridges, as seen in outline from the axis of the seal, have the form each of an obtuse isosceles triangle of which the apex meets the sealing edge and the base ends merge into the concave moulded face.

6. A seal according to claim 2, characterised thereby that the positive action ridges, as seen in outline from the axis of the seal, have the form each of a rhomboid of which one transverse point meets the sealing edge and the longitudinal ends merge into the concave moulded face.

7. A rotary shaft lip seal comprising a moulded ring of elastomeric material having a sealing edge defined by a moulded face, on the air side of the seal, said moulded face being concave so as to meet the sealing edge at a tangent angle of between 50° and 80° inclusive, positive action ridges moulded on said moulded face, said ridges presenting equal positive action vane surfaces obliquely meeting the sealing edge in equal numbers in opposite circumferential directions at an angle of not more than 20° and said ridges at the ends thereof further from said sealing edge merging into the concavity of said moulded face.

8. A sealing according to claim 7, characterized thereby that the vane surfaces of the positive action ridges meet the sealing edge at an angle of not more than 10°.

9. A seal according to claim 8, characterized thereby that the elastomeric material has a Young's modulus of between 3.5 and 8.5 MN/m$^2$.

10. A seal according to claim 7, characterized thereby that the positive action ridges, as seen in outline from the axis of the seal, have the form each of an obtuse isosceles triangle of which the apex meets the sealing edge and the base ends merge into the concave moulded face.

11. A seal according to claim 7, characterized thereby that the positive action ridges, as seen in outline from the axis of the seal, have the form each of a rhomboid of which one transverse point meets the sealing edge and the longitudinal ends merge into the concave moulded face.

* * * * *